United States Patent
Menzi et al.

(12)

(10) Patent No.: US 6,470,033 B1
(45) Date of Patent: Oct. 22, 2002

(54) PADDING PROCESS FOR PLESIOCHRONOUS DATA TRANSMISSION (II)

(75) Inventors: Ulrich Menzi, Burgdorf; Hans Zahnd, Emmenmatt, both of (CH)

(73) Assignee: Ascom Transmission AG, Bern (CH)

( * ) Notice: Subject to any disclaimer, the term of this patent is extended or adjusted under 35 U.S.C. 154(b) by 0 days.

(21) Appl. No.: 09/194,200

(22) PCT Filed: May 21, 1996

(86) PCT No.: PCT/CH96/00197

§ 371 (c)(1),
(2), (4) Date: Nov. 20, 1998

(87) PCT Pub. No.: WO97/44923

PCT Pub. Date: Nov. 27, 1997

(51) Int. Cl.[7] .................................................. H04J 3/06
(52) U.S. Cl. ........................................ 370/505; 370/516
(58) Field of Search ................................ 370/505, 506, 370/509, 466, 467, 535, 503, 510, 511, 512, 516, 518, 350, 527, 528, 529, 517; 375/354, 362, 372, 371, 375, 376

(56) References Cited

U.S. PATENT DOCUMENTS 5,563,891 A * 10/1996 Wang .......................... 375/372

FOREIGN PATENT DOCUMENTS

| EP | 0248551 A2 | 12/1987 |
| EP | 0549125 A1 | 6/1993 |
| WO | WO91/18457 | 11/1991 |

OTHER PUBLICATIONS

"Measured Pulse–Stuffing Jitter In Asynchronous DS–1/Sonet Multiplexing With and Without Stuff–Threshold Modulation Circuit", W. D. Glover et al., *Electronic Letters*, vol. 23 No. 18, pp. 959–961, Aug. 27, 1987.

Saman S. Abeysekera et al., Australian Telecommunications Research Institute, pp. 825–828.

Saman S. Abeysekera et al., Australian Telecommunications Research Institute, pp. 169–172.

* cited by examiner

*Primary Examiner*—Dang Ton

(57) ABSTRACT

In connection with plesiochronous data transmission, data are input into an elastic memory on the basis of a first clock pulse and read out on the basis of a second clock pulse which runs asynchronously with the first. Stuff bits are inserted at the end of a data frame as needed. For this purpose, the phase difference between clock pulses within a data frame is first of all measured. This phase difference is then compared with a threshold and a certain number of stuff bits are correspondingly inserted. In accordance with the invention, a frequency difference existing between the clock pulses is measured and, depending upon in which of several specified segments it lies, a correspondingly predefined modulation curve is used as threshold. Preferably a numerically optimized curve with respect to jitter amplitudes is used for each segment.

10 Claims, 2 Drawing Sheets

PADDING PROCESS FOR PLESIOCHRONOUS DATA TRANSMISSION (II)

Figure 1:
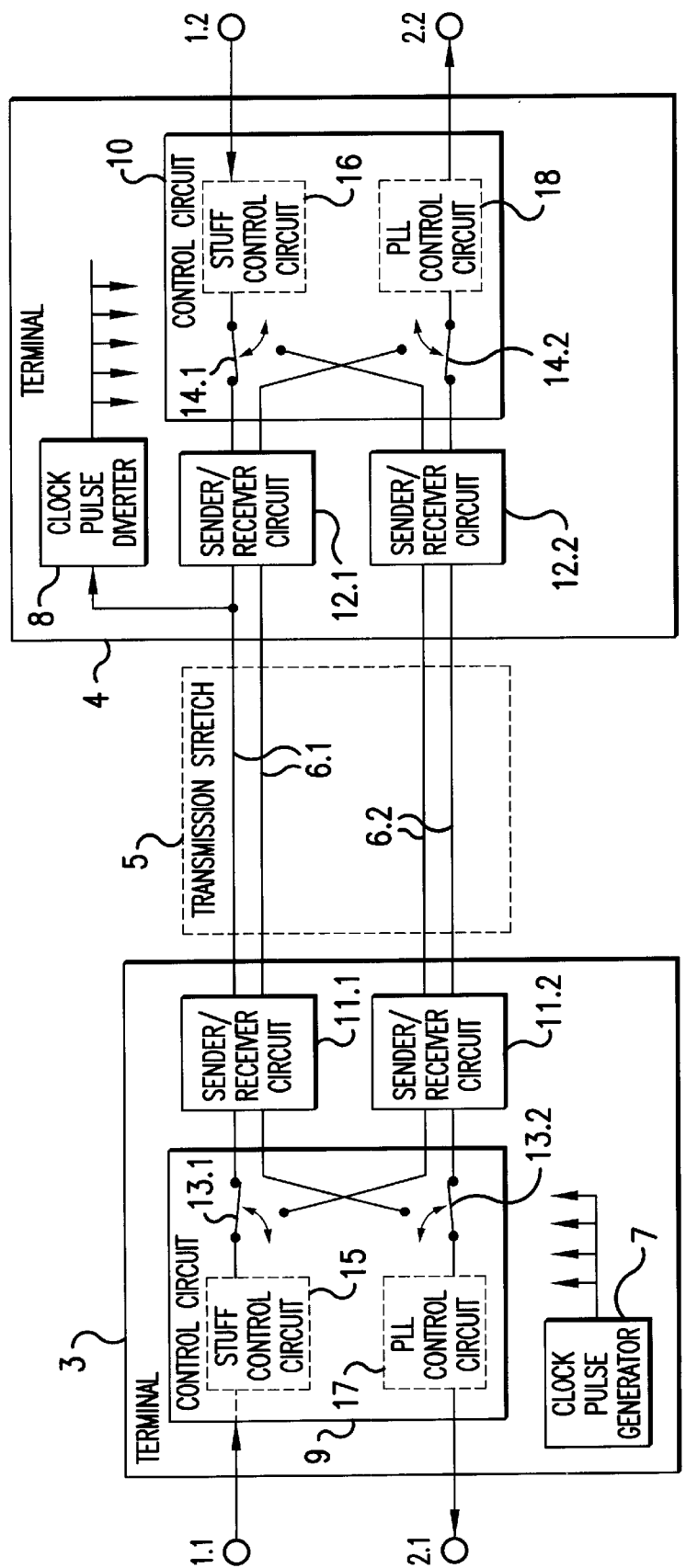

This application is the national phase under 35 U.S.C. §371 of prior PCT International Application No. PCT/CH96/00197 which has an International filing date of May 21, 1996 which designated the United States of America.

TECHNICAL AREA

The invention concerns a stuffing procedure for plesiochronous data transmission in connection with which:

a) stuff bits are input into an elastic memory on the basis of a clock pulse and b) are retrieved on the basis of a second clock signal which runs asynchronously with the first, whereby during reading out c) they are inserted at the end of a data frame as needed, and to be sure based upon a phase difference measured between the clock signals at least exceeding or falling short of a specified threshold.

Furthermore, the invention concerns a data transmission system and a terminal for implementing the procedure.

STATE OF THE ART

If two asynchronized pulse ranges in a data transmission system follow each other with approximately equal pulse rates, an elastic memory (FIFO memory) should be provided at the interface into which data should be input at the one rate and read out at the other. In practice, the frequencies of the two clock pulses deviate by some ppm as a rule. In order to assure that the elastic memory cannot be overfilled, the frequency of the retrieving clock pulse is selected slightly but sufficiently greater than that of the storing signal. Correspondingly, now and then stuffing bits are inserted into the reading out data flow. The insertion takes place (if need be) at the end of a data frame in any given case. This consequently leads to the length of the data frame (or in connection with firmly specified frame length, the number of useful bits) varying. If now a clock pulse is derived from the frame length (or the block length of the useful bits) in a subsequent component of the transmission system, then a low frequency "wander" or phase jitter occurs.

It is known that the jitter amplitudes can be reduced by a suitable choice of the stuffing procedure. It is known from the article "Measured pulse-stuffing jitter in asynchronous DS-1/sonet multiplexing with and without stuff-threshold modulation circuit," by W. D. Grover et al. Electronics Letters, Aug. 27, 1987, 23(18): 959–961, for example, that a stuff threshold modulation with a sawtooth curve can deliver better results than a constant threshold value.

REPRESENTATION OF THE INVENTION

The object of the present invention is to present a procedure of the type mentioned earlier that permits a reduction of jitter amplitudes which surpass the current state of the art.

The solution in accordance with the invention is defined by the characteristics of claim 1. Accordingly, a difference frequency existing between the clock pulses (for example, in the form of a ppm deviation) is measured, and an appropriately predefined modulation curve is set as the threshold as a function of which of several specified (difference frequency) segments it lies. The (threshold value) modulation curve can also vary from segment to segment. In accordance with the invention, at least two different segments with different modulation curves are specified.

Preferably a modulation curve optimized with respect to minimal jitter amplitudes is established in each segment. It has been shown that it is much simpler to avoid strong amplitude maximums for only a section of the overall maximum difference frequency allowable than for the entire area. There are, for example, modulation curves which permit high amplitudes to arise directly alongside the null point (which is defined in that the stuff rate $\rho=0.5$). Within the framework of the invention, for example, the region adjacent to the null point can be defined as an independent segment which operates with its own modulation curve. That is, outside the segment mentioned, a modulation curve "A" could be used, while within the same, another modulation curve "B" is adduced.

Preferably the segments vary in size. This must not, however, apply for all. Some can be of equal size without further ado.

For creating a numerically optimized modulation curve for a specific segment (or rather generally of a specified area), the invention proceeds as follows:

a) determination of an area of the stuff rate $\rho$ (for example, $\rho \in [0.53, 0.57]$) corresponding to the selected segment, that is, the limiting value of the admissible $\rho$ area;

b) fixing a desired number N of supporting values $T_O, \ldots, T_{N-1}$ and a numerical resolution $\in$ for each supporting value;

c) establishing a desired maximal index $K_{max}$ and determination of all index pairs (K, m) for which the stuff rate $\rho=m/KN$ lies in the admissible (in accordance with step a) area of the stuff rate $\rho$ (m=0, 1, 2 . . . K=1, 2, 3);

d) determination of those support values $T_O, \ldots, T_{N-1}$, which lead to the smallest values of the greatest amplitudes $D_{K,m}$. The amplitudes mentioned are defined here as follows:

$$D_{K,m} = \frac{1}{\pi \cdot K} \sqrt{(d^r_{K,m})^2 + (d^1_{K,m})^2} \quad \text{whereby:}$$

$$d^r_{K,m} = \frac{1}{N} \cdot \sum_{n=0}^{N-1} \cos\left[2 \cdot \pi \left(K \cdot T_n - \frac{m \cdot n}{N}\right)\right]$$

$$d^1_{K,m} = \frac{1}{N} \cdot \sum_{n=0}^{N-1} \sin\left[2 \cdot \pi \left(K \cdot T_n - \frac{m \cdot n}{N}\right)\right]$$

In this way, a numerically optimal modulation curve can be calculated for each segment (or any arbitrary ppm area). It is evident that this optimization must be carried out in advance. The modulation curves determined are stored in the form of truth tables in a memory in the data transmission system. The stuffing procedure then simply selects the right table and reads out the values varying from data frame to data frame.

It is apparent that the preferred numerical optimizing method basically can be used independently of the segmentation of the difference frequency area.

Preferably, the periodicity is $N \leq 10$. Good results can be obtained with $5 \leq N \leq 7$. The maximal value of the (whole number) index K is preferably not greater that $2^5$. Specifically, it is clear that the amplitudes $D_{K,m}$ are proportional to $1/K$. The maximal amplitude values to be minimized are present chiefly in connection with small index values.

The resolution $\in$ should be better than ⅕. Good results were obtained with, for example, a resolution of 1/20. With an all too fine resolution (for example <1/100), the numerical optimization becomes very protracted and is not capable of bringing forth any appropriate improvement of the result despite this.

In accordance with a preferred embodiment, 9 segments of, for example, −80 ppm to +80 ppm, are provided. The segmentation in accordance with the invention may unfold its gauges typically beginning with 4 segments. The optimal number will, however, depend upon the individual case. In a concrete application, operations were successful with, for example, 9 or 14 segments.

A terminal which has a circuit for determining a difference frequency existing between the clock pulses and a correspondingly relevant segment, and which disposes over a memory which contains a modulation curve for each segment is basic for a data transmission system of the invention. With unequally large segments, a table with the respective segment limitations should furthermore be provided.

The following advantageous embodiments and feature combinations result from the detailed description and the totality of patent claims.

SHORT DESCRIPTION OF THE DRAWINGS

Figure 2:
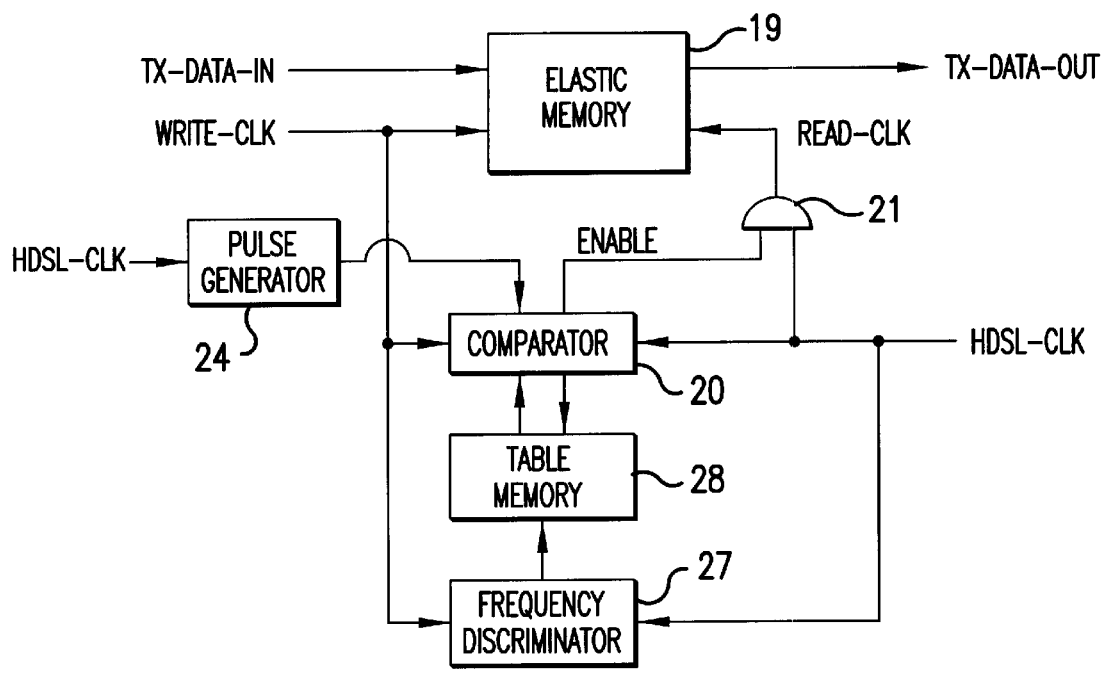
Figure 3:
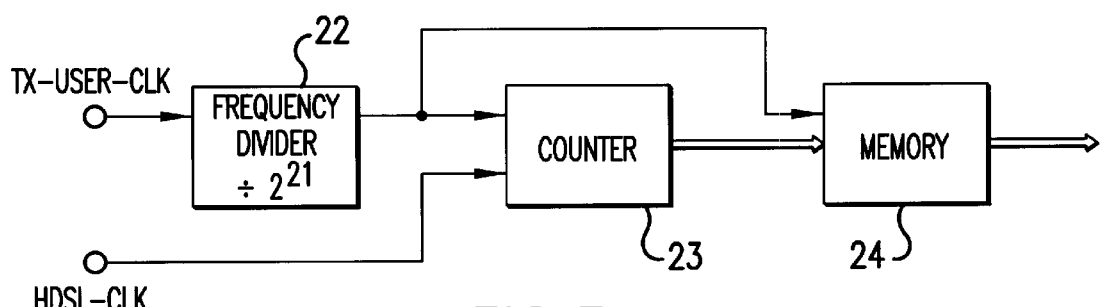
Figure 4:
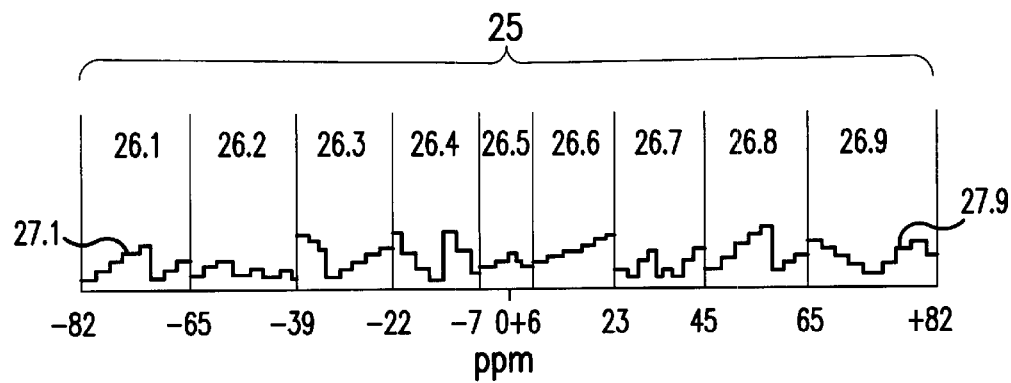

The drawings used for elucidation of the embodiment show:

FIG. 1 A schematic representation of a plesiochronous data transmission system;

FIG. 2 A block diagram of a circuit for implementing stuff control;

FIG. 3 A schematic representation of a circuit for determining the difference frequency;

FIG. 4 A schematic representation of a segmentation of the difference frequency area of the invention;

WAYS OF CONSTRUCTING THE INVENTION

FIG. 1 schematically illustrates an example for a transmission system. This is constructed for full duplex operation. One proceeds from the assumption that data are to be transmitted between a first and a second station. Correspondingly, a data source 1.1 or 1.2 and a data sink 2.1 or 2.2 are provided at both places. Data sources 1.1, 1.2 and data sinks 2.1, 2,2 are typically contained in external devices (computer, digital telephone stations or the like). The throughputs of these devices are, for example, nominally established at 2,048 Kbit/sec. With regard to hardware, this is specified by a nominal frequency with a tolerance range (for example, f=2,048 KHz±50 ppm).

A terminal 3 or 4 is present for each of these stations. The data transmission between the terminals 3, 4 (that is, the transmission stretch 5) is formed by two pairs of copper wires 6.1, 6.2, for example. These are operated with a throughput which is somewhat higher than half the throughput of data sources 1.1, 1.2. It amounts, for example, to 1,168 Kbit/sec (HDSL clock rate). The maximal transmission performance thus lies at 2,336 Kbit/sec.

One of the two terminals has an independent clock pulse generator 7 for creating the clock pulse for data transmission. This clock signal is taken over by the clock pulse diverter 8 in the second terminal 4. The terminals 3, 4 are thus synchronized with each other.

The plesiochronous interface exists between the terminals 3, 4 and the external data sources or sinks 1.1, 1.2 or 2.1, 2.2. On the one hand, the data to be transmitted are distributed to the two copper wire pairs, with a control circuit 9 or 10 (framer), and on the other, the data received are brought together and read out to the data sink 2.1 or 2.2. The copper wire pairs 6.1, 6.2 are served by sender/receiver circuits 11.1, 11.2, 12.1, 12.2 (data pumps). The control circuit 9 or 10 distributes the data to be transmitted to the two sender/receiver circuits 11.1, 11.2 or 12.1, 12.2 (circuit 13.1, 14.1) and on the other hand brings the entering data together (circuit 13.2, 14.2).

Basic to the invention is the stuff control circuit 15, 16 incorporated into the control circuit 9, 10. This includes, in accordance with FIG. 2, in each case an elastic memory 19, comparator 20 and an AND gate 21. The data to be transmitted (TXDATAIN) is input into memory 19 on the basis of the clock pulse (WRITECLK) of signal source 1.1. It is issued on the basis of the clock pulse of the transmission system (HDSLCLK). Since reading out takes place at a slightly higher pulse rate than inputting, stuff bits must be inserted now and then. A comparator 20 is provided for controlling this process which compares the two clock pulses (WRITE CLK and HDSL CLK) and generates an enable signal as a function of the accumulated phase difference within a data frame which is joined with the HDSL clock pulse in the AND gate 21. A frame end pulse generator 24 indicates the useful data blocks in each case. Whenever the phase difference exceeds a certain threshold value upon the occurrence of the frame end pulse, then the read out pulse (READ CLK) is maintained for 4 HDSL pulse periods, for example. (Since the number of useful bits per data frame are known on the part of the receiver, it is possible to eliminate the stuff bits generated in the way mentioned.)

Within the frame of the invention, the threshold value for the phase difference now varies from frame to frame in a specified way (stuff threshold modulation). The difference frequency must be determined in advance for this purpose. A frequency discriminator 27 is provided in the example shown which compares WRITE CLK and HDSL CLK and submits the difference frequency (for example, in the form of a counter reading which can be converted into a ppm value) to the table memory 28.

FIG. 3 depicts a circuit for measuring the difference frequency by way of example. The clock pulse TX USER CLK of the external data source is given to the entry of a frequency divider 22. This realizes, for example, a $2^{21}$ division proportion. The resulting down divided outlet signal is given on the one hand to the reset entry of a counter 23 and on the other to the clock entry of a memory 24. The counter 23 is incremented by the clock pulse HDSL CLK (and correspondingly reset to the initial pulse of the frequency divider). On the output side of the counter 23, a word (counter reading) is generated with 8 bits which is deposited in memory 24. From there, it can be picked up, for example, by a microprocessor of the terminal (for the purpose of determining the relevant segment and the proper modulation curve).

It is clear that the difference frequency can also be determined in other ways.

Whenever the comparator 20 on the frame end needs a threshold value, it accesses the table memory 28. There a large number of digitalized modulation curves are deposited in accordance with the invention. Which of these curves is to be used depends upon the difference frequency determined. The segmentation of the difference frequency range and the suitable choice of modulation curves will be explained below.

An area 25 from −82 ppm to +82 ppm is represented in FIG. 4. This area 25 depends upon the concrete system parameters. It basically results from the fact that the clock pulse of the data source as well as that of the transmission system may deviate from the nominal value by a specified range. The maximal ppm deviation is defined by a norm as a rule. (The ppm values used in the present description basically represent the sum of the relative deviations of the user clock and the HDSL clock from the specified nominal value of the corresponding pulse rate in any given case).

The entire ppm area 25 is subdivided into a large number of segments 26.1 to 26.9. A (digital) modulation curve 27.1 to 27.9 is assigned to each segment. As is recognizable from the indicated ppm values, not all segments 26.1 to 26.9 are equally large. In particular the segments close to 0 ppm are smaller than those in connection with higher ppm values. The smallest segment 26.5 lies in the middle in the present example, the largest segments 26.1, 26.9 lie outside.

A stuff rate ρ corresponds to each deviation (Xppm) in the ppm area. The relationship is determined by the following formula:

$$\rho = \frac{L}{4} = \left[\frac{L+2}{L(1+Xppm)} - 1\right]$$

L=the number of useful bits per data frame

For each segment, another modulation curve can be determined. It results from a numerical optimization in accordance with a preferred embodiment in the following manner:

1. First of all, a segment is selected and the corresponding area for the stuffing rate ρ is determined. Furthermore, the number N of supporting values $T_O \ldots T_{N-1}$ is fixed as needed (period of stuffing threshold modulation). Finally, a threshold value range for $T_O \ldots, T_{N-1}$ including resolution is established. A range from 0 to 4 signal pulses (assumption: maximum of 4 stuff bits) and a resolution of ∈=0.2 can be established for all supporting values. These areas are suitable for the implementation of a 0/4 stuff bit procedure, for example.

2. All pairs (K,m) which yield a stuffing rate ρ within the fixed area are determined next. The following formula is used for this:

$$\rho = \frac{m}{K \cdot N}$$

whereby:
K=1, 2, . . . $K_{max}$
m=0, 1, 2, . . .
$K_{max}$ can basically be of any size. It has nonetheless been shown that good results can be obtained with $K_{max} \leq 32$.

3. Now the amplitude values $D_{K,m}$ are determined for all pairs of numbers (K,m) according to the following formula:

$$D_{K,m} = \frac{1}{\pi \cdot K} \sqrt{(d^r_{K,m})^2 + (d^i_{K,m})^2} \quad \text{whereby:}$$

$$d^r_{K,m} = \frac{1}{N} \cdot \sum_{n=0}^{N-1} \cos\left[2 \cdot \pi\left(K \cdot T_n - \frac{m \cdot n}{N}\right)\right]$$

$$d^i_{K,m} = \frac{1}{N} \cdot \sum_{n=0}^{N-1} \sin\left[2 \cdot \pi\left(K \cdot T_n - \frac{m \cdot n}{N}\right)\right]$$

For every possible N-tupel ($T_O \ldots, T_{N-1}$), a set of amplitude values $D_{K,m}$ defined by the permissible pairs (K, m) results. For the numerical optimization standing under discussion, it is primarily of interest how large the maximal amplitude value occurring in a certain set is. A set the amplitude values of which are as small as possible or which do not exceed a suitable maximum value is sought.

In connection with optimization, the N-tupel ($T_O, \ldots, T_{N-1}$) is varied over all permissible supporting values, and all amplitude values $D_{K,m}$ are calculated for each combination. That N-tupel ($T_O, \ldots, T_{N-1}$), which shows the best amplitude values also defines the optimal supporting value combination or the optimal modulation curve. In this way, optimal modulation curves can in principle be determined for all segments. In practice, the optimization described above can lead to several equivalent modulation curves (if, for example, no marked minimum is available). The invention thus also accommodates suboptimal modulation curves.

The numerical optimization can also take place in other ways. It is especially conceivable that a certain curve type is regarded as specified (for example, a saw tooth or a Gaussian curve), and that only the scaling (for example, the parameters periodicity, range of values) are optimized. Hence it is possible, for example, that an saw tooth curve optimal in each case is used as the modulation curve in each segment.

For the 0/4 stuffing procedure, a curve with the following values is computed for the overall area, for example:

1.2
2.4
2.4
1.2
0.0
0.0

The modulation curves and segments of the invention can be stored in a ROM of the terminal. The stuffing procedure successively adduces the various values of the modulation curves to be considered on the basis of the phase difference determined.

For a 0/2/4 stuffing procedure, two thresholds (thresholds 1, threshold 2), for example, are deformed which vary synchronously (in accordance with the values specified in the table) and have a distance of 2 HDSL. A new threshold is established for each data frame (index). (As a rule, the threshold value will continually change which does not mean, however, that exceptionally two successive values can be equal). Inserting the stuff bits takes place on the basis of the following comparisons:

Phase difference ≧-threshold 1 insert 0 stuff bits
Threshold 2≦phase difference <-threshold 1 insert 2 stuff bits Phase difference <-threshold 2 insert 4 stuff bits The threshold modulation of the invention leads to a receiver side phase locked control loop 17, 18 (cf. FIG. 1) below the cutoff frequency (that is, typically in the <1 Hz range) having rather small jitter or wander amplitude peaks.

The stuffing threshold modulation of the invention indeed brings especially good results for 0/4 and 0/2/4 stuffing procedures (that is, stuffing procedures with one or two thresholds). Other applications are, however, quite appropriate. Basically, it does not depend on how many bits are inserted in each case. With regard to hardware, transmission systems with three pairs or only one wire pair are of interest in addition to those with two wire pairs. Of course, the invention can be used in any arbitrary transmission system (specifically even in optical transmission systems).

In sum, it should be stated that a further reduction of amplitude peaks of phase jitter can be reached through the segmentation of the invention.

What is claimed is:

1. Stuffing process for plesiochronous data transmission, the process including:
   inputting data on the basis of a first clock pulse into an elastic memory;
   retrieving data on the basis of a second clock pulse which runs asynchronously with the first;

inserting stuff bits while reading out at the end of a data frame, and to be sure based on a phase difference between measured between the clock pulses exceeding or falling short of a specified threshold, wherein difference frequency existing between the clock pulses is measured, and a predefined modulation curve is used as threshold depending upon which of several specified segments it lies in.

2. Stuff process according to claim 1, wherein the modulation curve of a segment is optimized with respect to a minimal jitter amplitude, and wherein at least two different modulation curves are used.

3. Stuffing process according to claim 2, wherein the segments are of different size.

4. Stuffing process according to claim 1, further including the following steps, which are carried out in advance for generating a numerically optimized modulation curve for a selected segment:

determining an admissible stuffing rate ρ area corresponding with the selected segment;

fixing a desired number N of supporting values $T_O, \ldots T_{N-1}$ and a numerical resolution $\in$ for each supporting value;

establishing a desired maximal index $K_{max}$ and determination of all index pairs K,m, for which the stuff rate ρ=m/KN lies in the admissible range;

determining those supporting values $T_O, \ldots, T_{N-1}$, which lead to the smallest values of the amplitude maxima of amplitudes $D_{K,m}$ $$D_{K,m} = \frac{1}{\pi \cdot K} \sqrt{(d^r_{K,m})^2 + (d^1_{K,m})^2} \quad \text{whereby:}$$

$$d^r_{K,m} = \frac{1}{N} \cdot \sum_{n=0}^{N-1} \cos\left[2 \cdot \pi\left(K \cdot T_n - \frac{m \cdot n}{N}\right)\right]$$

-continued $$d^1_{K,m} = \frac{1}{N} \cdot \sum_{n=0}^{N-1} \sin\left[2 \cdot \pi\left(K \cdot T_n - \frac{m \cdot n}{N}\right)\right].$$

5. Stuffing process according to claim 4, wherein the number N≦10.

6. Stuffing process according to claim 4, wherein the maximal index is $K_{max}$≦25.

7. Stuffing process according to claim 4, wherein the resolution comes to 1/100≦∈≦1/20.

8. Stuffing process according to claim 1, wherein at least 4 segments are used.

9. A data transmission system which uses a stuffing procedure with terminals arranged on the end side of a transmission stretch, including:

a clock pulse source for data transmission and at least one elastic memory for intermediate storage of entering data to be transmitted;

a comparator for ascertaining a phase difference between a clock pulse of the entering data and the clock pulse source;

a frame generator with a stuffing bit control circuit;

a circuit for determining a difference frequency existing between clock pulses;

a memory with one modulation curve each for each of several specified segments; and a circuit for determining in which of the segments the difference frequency lies in order to use the appropriately predefined modulation curve as a threshold depending upon the segment determined.

10. The stuffing process of claim 5, wherein the number N is such that 5≦N≦7.

* * * * *